(12) United States Patent
Ghafourifar et al.

(10) Patent No.: US 10,169,300 B2
(45) Date of Patent: Jan. 1, 2019

(54) ADVANCED ZERO-KNOWLEDGE DOCUMENT PROCESSING AND SYNCHRONIZATION

(71) Applicant: Entefy Inc., Palo Alto, CA (US)

(72) Inventors: Alston Ghafourifar, Los Altos Hills, CA (US); Brienne Ghafourifar, Los Altos Hill, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 15/858,628

(22) Filed: Dec. 29, 2017

(65) Prior Publication Data

US 2018/0189245 A1    Jul. 5, 2018

Related U.S. Application Data

(62) Division of application No. 15/396,516, filed on Dec. 31, 2016, now Pat. No. 10,055,384.

(51) Int. Cl.
*G06F 17/30* (2006.01)
*G06F 21/62* (2013.01)
(Continued)

(52) U.S. Cl.
CPC .......... *G06F 17/211* (2013.01); *G06F 17/227* (2013.01); *G06F 17/2247* (2013.01);
(Continued)

(58) Field of Classification Search
CPC ............. G06F 17/30997; G06F 17/211; G06F 17/30896; G06F 17/30005; G06F 17/227;
(Continued)

(56) References Cited

U.S. PATENT DOCUMENTS

2007/0113172 A1*  5/2007  Behrens .............. G06F 17/2229
                                               715/239
2008/0228851 A1*  9/2008  Angelov ........... G06F 17/30893
                                               709/201
(Continued)

OTHER PUBLICATIONS

Meunier, et al., "A System for Converting PDF Documents into Structured XML format," Feb. 13, 2006, Xerox Research Center Europe, p. 1-12.

*Primary Examiner* — Nelson Giddins
(74) *Attorney, Agent, or Firm* — Blank Rome LLP (57) ABSTRACT

Techniques disclosed herein decouple a document's structure from its general content wherein the structure is retained in plaintext (both at a client device and in a server system) and the data is retained in cyphertext, and where the cloud-based server system is not tasked with the saving or management of the relevant cryptographic keys. Because the network- or cloud-based server system has "zero-knowledge" about the document's data content or the relevant cryptographic keys, an attack on the server system does not put the security of the document's data at risk. In addition, the network- or cloud-based server system may be used to perform the computationally intensive tasks of converting the document between a first format (often associated with a full-function document processing application not supported by the client device) and a second format (easily displayed and manipulated by a client device).

20 Claims, 7 Drawing Sheets

(51) Int. Cl.
  *G06F 17/22* (2006.01)
  *H04L 29/06* (2006.01)
  *G06F 17/21* (2006.01)
  *H04L 9/32* (2006.01)
  *G06F 21/00* (2013.01)

(52) U.S. Cl.
  CPC .... *G06F 17/2264* (2013.01); *G06F 17/30005* (2013.01); *G06F 17/30896* (2013.01); *G06F 17/30997* (2013.01); *G06F 21/00* (2013.01); *G06F 21/6209* (2013.01); *H04L 9/32* (2013.01); *H04L 63/0428* (2013.01)

(58) Field of Classification Search
  CPC ............. G06F 17/2264; G06F 17/2247; G06F 21/6209; G06F 21/00; H04L 9/32; H04L 63/0428
  See application file for complete search history.

(56) References Cited

U.S. PATENT DOCUMENTS

| | | | |
|---|---|---|---|
| 2009/0132564 A1* | 5/2009 | Ishizaki | G06F 17/2247 |
| 2009/0195237 A1 | 8/2009 | Feliss | |
| 2010/0211745 A1 | 8/2010 | Jeddeloh | |
| 2011/0301778 A1 | 12/2011 | Liang | |
| 2014/0101456 A1* | 4/2014 | Meunier | G06F 17/2247 |
| | | | 713/189 |
| 2015/0081970 A1 | 3/2015 | Williams | |
| 2015/0276557 A1 | 10/2015 | Masuda | |
| 2016/0087976 A1 | 3/2016 | Kaplan | |
| 2016/0284073 A1 | 9/2016 | Michalscheck | |
| 2017/0026170 A1* | 1/2017 | Farkash | H04L 9/0618 |
| 2017/0144562 A1 | 5/2017 | Thomas | |
| 2017/0214521 A1* | 7/2017 | Busch | H04L 9/0618 |
| 2017/0230352 A1* | 8/2017 | Chen | H04L 63/0442 |

* cited by examiner

ADVANCED ZERO-KNOWLEDGE DOCUMENT PROCESSING AND SYNCHRONIZATION

BACKGROUND

This disclosure relates generally to cloud-based computing. More particularly, but not by way of limitation, this disclosure relates to a zero-knowledge approach to cloud-based document processing.

As the world's computing ecosystem evolves toward a "cloud-based" environment, more and more users (individual and corporate) will generate, edit and distribute documents on-line. At least one web-based editing program allows users to create, share and edit documents through a network. This program allows users to upload a number of differently formatted text-based documents into the system. From there, such documents are converted into the format used by the on-line editing program. Once this process is completed multiple users can work on the same document in real-time, editing content and altering the document's structure from any location with Internet access (e.g., adding text, adjusting margins, adding or changing headers and footers, and inserting or deleting pictures). When the cloud-based document is ready for publication, it may be output or exported in any number of formats such as Microsoft Corporation's Word or Rich Text format (RTF), the Apache Software Foundation's OpenOffice format, Adobe System's portable document format (PDF) or HyperText Markup Language (HTML) format. Products that enable cloud-based document preparation and/or collaboration between multiple users are implemented using a central server computer system to perform various transmission and conversion functions so that client applications, at each end-user, can view and edit document content in real-time. In doing so, the potentially highly sensitive content of these documents is necessarily exposed to the central server (that is, such systems are not "zero-knowledge"). This exposure creates a vulnerability for user privacy and system security.

SUMMARY

In one embodiment the disclosed concepts provide a network or cloud-based document processing method. The method includes obtaining access to a first document having a first format (e.g., such as that generated by a full-function document processing application), wherein the first format is characterised by a structure having a plurality of structural elements, at least some of the structural elements further having content. The first document may then be analyzed by identifying a first structural element of the first document's structure (e.g., a paragraph, title, list or table); identifying first content of the first structural element; encrypting, based on a first crytographic key, the first content to generate a first cyphertext; generating a first token for the first cyphertext (e.g., a randomly generated identifier); replacing the first content in the first structural element with the first token to generate a modified first document; storing the first token and the first cyphertext in a metadata portion; transmitting the modified first document and the metadata portion to a network-based server system; and requesting the network-based server system convert the modified first document from the first format to a second format, wherein the second format comprises a markup format. In one embodiment the metadata portion may be stored in the same file as the modified first document, while in other embodiments the two may be in separate files. Throughout this disclosure, the term 'metadata' may be used to include any data derived from, copied out of, or determined relevant to a given document and therefore, can include such information as edit date, upload date, size, and so on, while also containing more substantial information as full text content, images, authentication tokens, and so on.

In another embodiment the disclosed concepts provide a method that includes requesting, from a network-based server system, a converted document, wherein the converted document includes a plaintext portion and a cyphertext portion, the plaintext portion comprising a plaintext structural element, the plaintext structural element having a token, the cyphertext portion comprising the token and a corresponding cyphertext; receiving, from the network-based server system and in response to the requesting, the plaintext portion and an authorization request; sending, in response to the authorization request, authorization credentials to the network-based server system (e.g., a username and/or password); receiving, from the network-based server system and in response to the authorization credentials, the cyphertext portion; decrypting the cyphertext to generate content; identifying a location in the plaintext portion based on the cyphertext's corresponding token (e.g., by matching the structural element's token value and the cyphertext's corresponding token value); replacing the token in the plaintext portion with the content; and displaying the converted document based on the plaintext structural element and the content.

The various methods described herein may be embodied in computer executable program code and stored in a non-transitory storage device. In some embodiments, the methods may be implemented in an electronic end-user device.

DETAILED DESCRIPTION

This disclosure pertains to systems, methods, and computer readable media to improve the operation of network- or cloud-based document processing systems. In general, techniques disclosed herein decouple a document's structure from its data wherein the structure is retained in plaintext (both at a client device and in the cloud) and the data is retained in cyphertext (when not at a client device), and where the cloud-based server system is not tasked with the saving or management of the relevant cryptographic keys. Because the network- or cloud-based server system has "zero-knowledge" about the document's data content or the relevant cryptographic keys, an attack on the server system does not put the security of the document's data at risk. In addition, the network- or cloud-based server system may be used to perform the computationally intensive tasks of converting the document between a first format (often associated with a full-function document processing application not supported by the client device) and a second format (easily displayed and manipulated by a client device).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of cloud-based document processing systems having the benefit of this disclosure.

Figure 1:
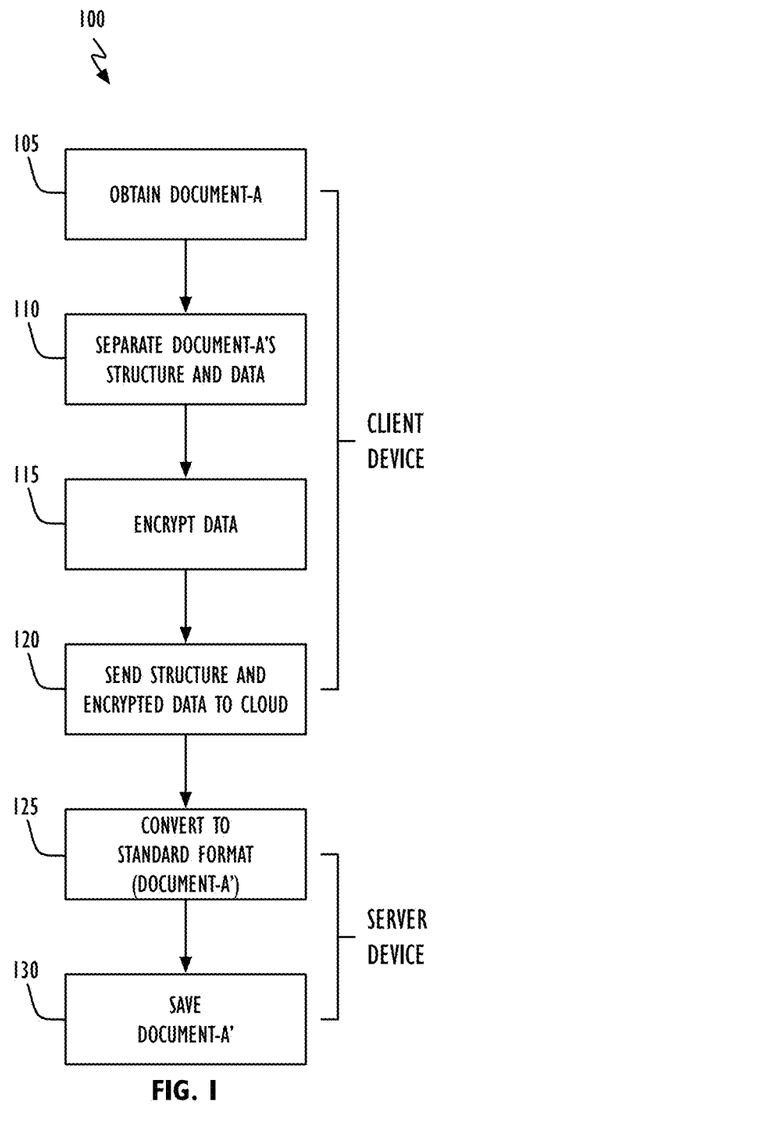
FIG. 1 shows, in flowchart form, a document processing operation in accordance with one or more embodiments.

Referring to FIG. 1, document processing operation 100 in accordance with one or more embodiments may begin when a client device obtains a document, hereinafter referred to as document-A (block 105). A client device may be thought of as a piece of computer hardware and/or software that accesses a service made available by a server computer system. In general, client devices have less computational resources than those available to a server computer system (e.g., processor capability, memory and power). Illustrative client devices include, but are not limited to, mobile telephones, digital watches, digital entertainment devices and tablet computer systems. The client device may obtain document-A from any convenient source such as through an e-mail, a text message, or from a server computer system through conventional networking technology. Example document formats include, but are not limited to, Microsoft Corporation's Word or Rich Text format (RTF), the Apache Software Foundation's OpenOffice format or Adobe System's portable document format (PDF); documents such as these may be generated using a full-function document processing application that cannot be executed on many client devices. Once obtained, document-A may be analyzed to identify and separate structure from content or data (block 110). As used herein, a document's structure refers to its layout in terms of, for example, margins, list structures, pagination, paragraphs, titles, tables, font types, styles and size. In contrast, a document's data refers to the content of these different structural elements. For example, the words within a paragraph, title, header or footer, the elements of a list, the contents of a table cell or of a table in toto. Each data element may be encrypted and an identifier or token generated that can be substituted for the data in the original document (block 115). The structure/content separated file generated by the client device may be sent to a network- or cloud-based server system (block 120) that can undertake the computationally intensive task of converting the file into a standardized format; one that may be used to replicate (or nearly replicate) the original document's presentation but which is easily processed by the client device (block 125). Illustrative formats include the HyperText Markup Language (HTML), the eXtensible Markup Language (XML) or, more generally, any Standard Generalized Markup Language (SGML). The converted file (hereinafter document-A') may be saved at the server computer system, at another network storage site and/or transmitted back to the original client device (block 130). As used herein, document-A' includes file-A' (capturing structural information for document-A) and metadata-A' (capturing encrypted content information for document-A). Documents undergoing operations in accordance with blocks 110 and 115 may be transmitted without fear (during transit or at the server computer system) because, while the structural information is sent in plaintext (i.e., not encrypted), the data is encrypted and the key(s) used to perform the encryption are not sent with the modified document to the server computer system. That is, the server computer system has zero-knowledge with respect to the encrypted data.

Figure 2:
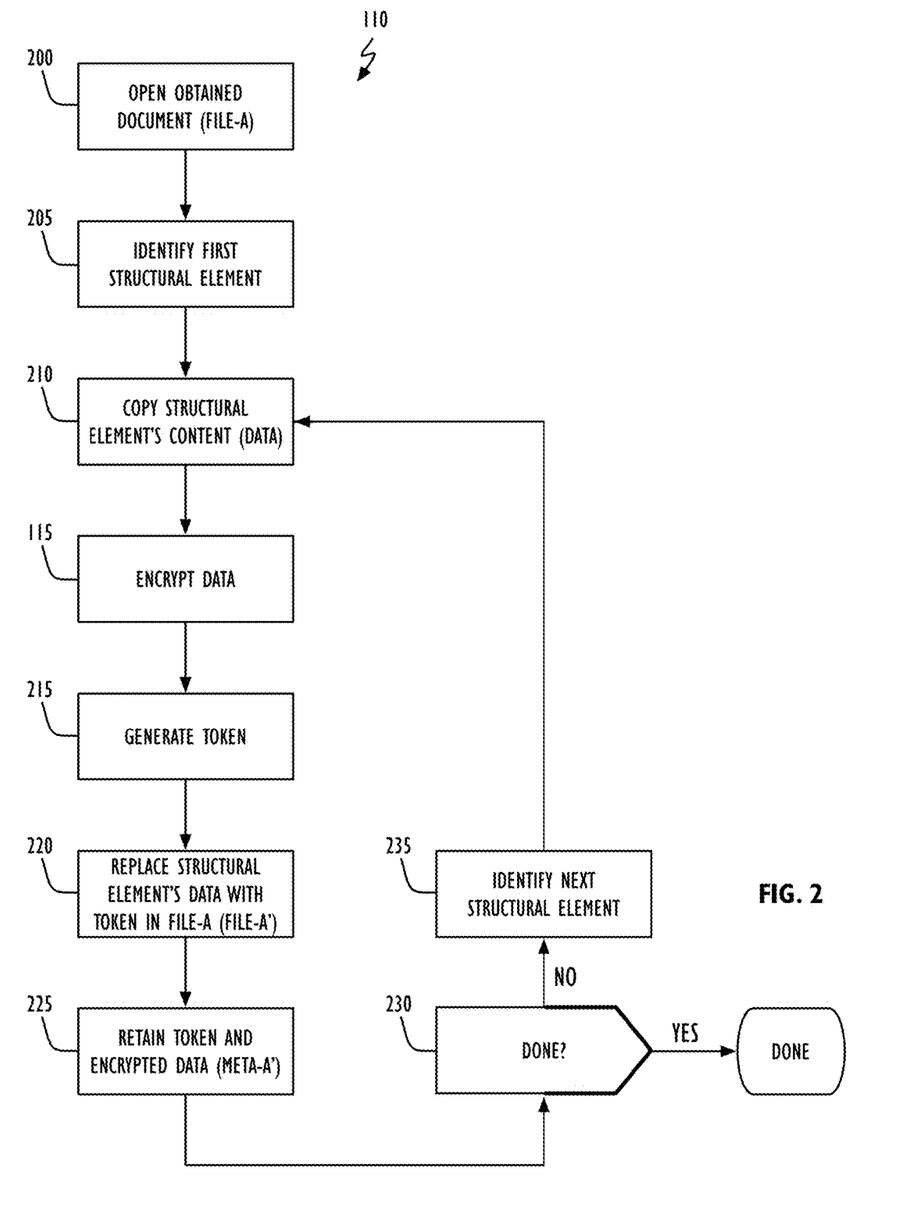
FIG. 2 shows, in flowchart form, a structure-data separation operation in accordance with one or more embodiments.

Referring to FIG. 2, structure-data separation operation 110 in accordance with one or more embodiments begins by opening the obtained document or document-A (block 200). In practice, a copy of document-A is opened and manipulated (hereinafter referred to as file-A). File-A may then be analyzed so as to identify a first structural element or container (block 205). The content of this structural element (hereinafter referred to as data) may be copied (block 210) where after the data may be encrypted in any desired manner (block 115). In one embodiment, the encryption may be performed using a symmetric key (user or group). In another embodiment, public-key (asymmetric) encryption may be used. In yet another embodiment, a combination of symmetric and asymmetric encryption may be used. In still other embodiments substitution, transposition and stenographic cipher techniques may be used. For each encryption operation a unique identifier or token may be generated (block 215) and the token substituted for the encrypted data within file-A (block 220). File-A modified in accordance with block 220 will hereinafter be referred to as file-A'. The encrypted data element, or cyphertext, and token may be associated with one another—e.g., in a key-value pair—and stored for later use in, for example, metadata associated with file-A', hereinafter metadata-A' or meta-A' (block 225). In this way each token may be used to uniquely identify where in file-A' the corresponding data should be placed. After a token-cyphertext pair is stored in metadata-A', a check may be made to determine if all structural elements within file-A' have been identified and processed (block 230). If all structural elements have been identified and processed (the "YES" prong of block 230), operation 110 is complete. If at least one structural element remains to be identified and processed (the "NO" prong of block 230), a next structural element is identified (block 235), where after operation 110 continues at block 210.

As described above, embodiments in accordance with FIG. 2 encrypt all data as it is identified. That is, the contents of all structural elements or containers. In other embodiments, a user may be given the opportunity to specify what data elements they wish to protect. For example, a user may specify that all tables or all paragraphs be encrypted and that all titles or headings remain in plaintext. In still another embodiment, a user may be queried after each structural element is identified as to whether they want that particular element protected/encrypted. It should be understood that in those embodiments in which some content is not encrypted, file-A' may include more than structural information. That is, file-A' may include content not elected for encryption.

In one embodiment, the encryption granularity may be specified. For example, the encryption granularity may be at the word level (e.g., every word is encrypted separately from every other word). In other embodiments, the encryption granularity may be at the structural element level (e.g., all the words of a title or paragraph). In still other embodiments, the encryption granularity may be set or specified by the user in real-time and may therefore change from structural element to structural element. In yet other embodiments, the act of encryption may take place not after each structural element is identified or selected, but all at once—after all structural elements have been identified or selected.

Figure 3:
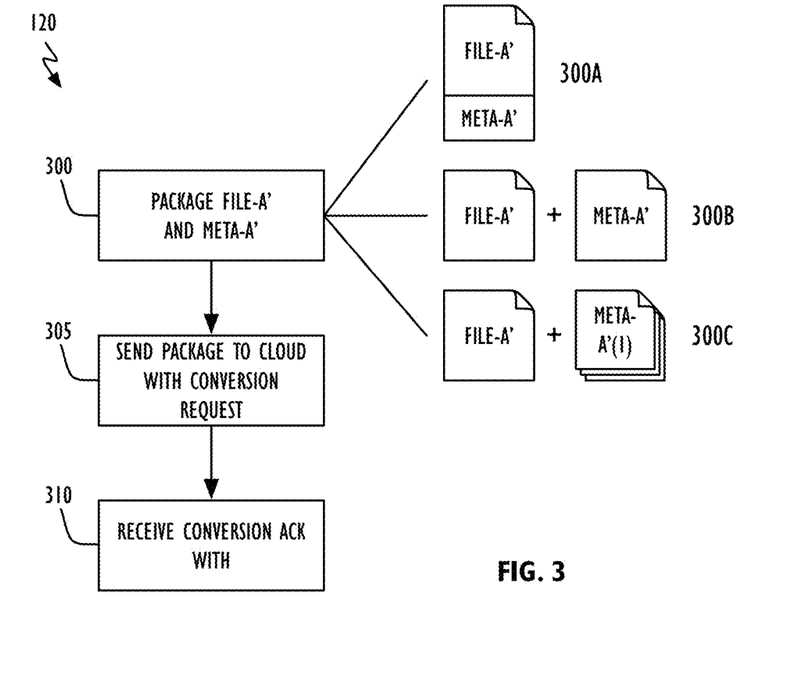
FIG. 3 shows, in flowchart form, a file operation in accordance with one or more embodiments.

Referring to FIG. 3, operations in accordance with block 120 may package or combine file-A' and metadata-A' (block 300) prior to sending the combination to a network- or cloud-based server system with an request that the file be converted to a format suitable for the client device (block 305). In one embodiment, file-A' and metadata-A' may be combined into single file 300A. In another embodiment, file-A' and metadata-A' may be retained in their own files 300B. In yet another embodiment, file-A' may be retained in one file while metadata-A' may be broken into a plurality of files 300C (meta-A'(1) . . . ). This latter approach may be beneficial when implementing tiered levels of "privateness." That is, when one or more individuals are entitled to view some data (e.g., data associated with metadata-A'(1)) but not other data (e.g., data associated with metadata-a'(2)). One of ordinary skill in the art will recognize that there may be any number of levels of private-ness. Although not necessary, the metadata associated with each private level may be retained in its own file. In practice, it has been found beneficial in some embodiments for the server system performing the conversion to issue an acknowledgement to the client device (block 310). This acknowledgement may also include a reference or pointer to the original document-A or the file-A' and metadata-A' transmitted in accordance with block 305.

Figure 4:
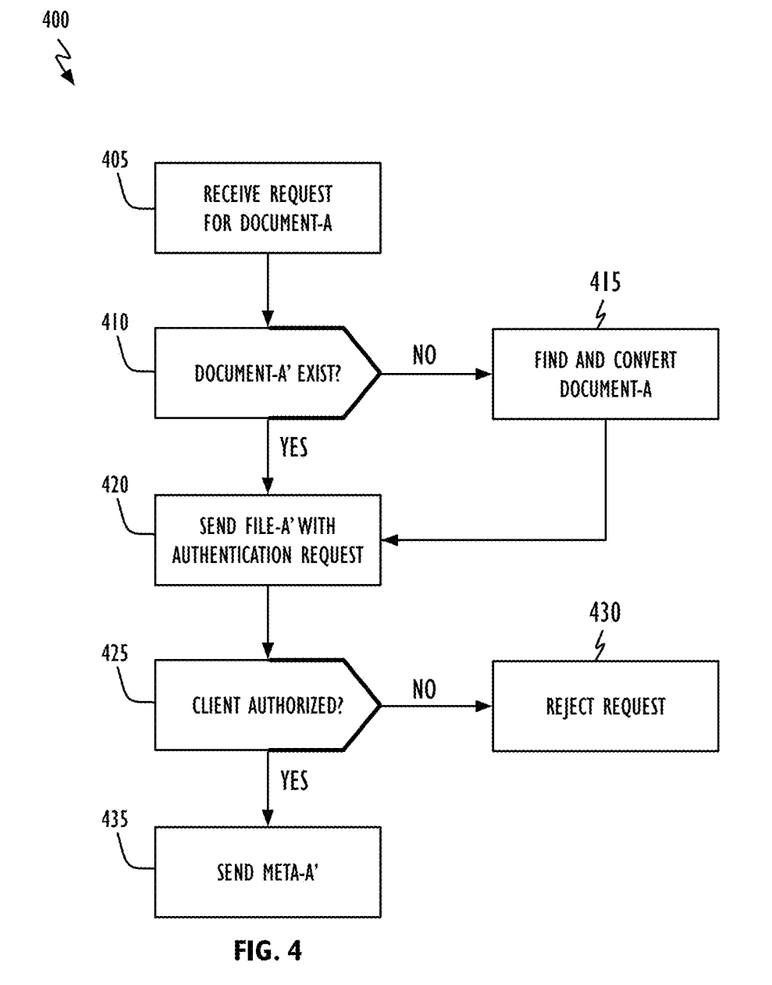
FIG. 4 shows, in flowchart form, a server system response operation in accordance with one or more embodiments.

Referring to FIG. 4, server system response operation 400 may be initiated when the server system receives a request from a client device for a designated document, document-A (block 405). If (converted) document-A' is not available (the "NO" prong of block 410), document-A may be found and conversion operation 125 performed (block 415). If document-A' is available (the "YES" prong of block 410) or after document-A is found and converted (output from block 415), the server system may send the file-A' portion of document-A' to the requesting client device along with an authorization request (block 420). If the client device cannot respond with the appropriate authorization credentials (the "NO" prong of block 425), the client device's request may be rejected (block 430). By way of example, authorization credentials may include a username and/or password. If the client device responds with the proper credentials (the "YES" prong of block 425), server system may send the metadata-A' portion of document-A' to the requesting client device—directly or through an application programming interface (block 435). To be clear, metadata-A' includes the encrypted data from original document-A along with tokens that may be associated with specific locations within file-A'. It should be understood that if the server computer system is unable to find or convert document-A (in accordance with block 415), an appropriate message may be returned to the client device.

Figure 5:
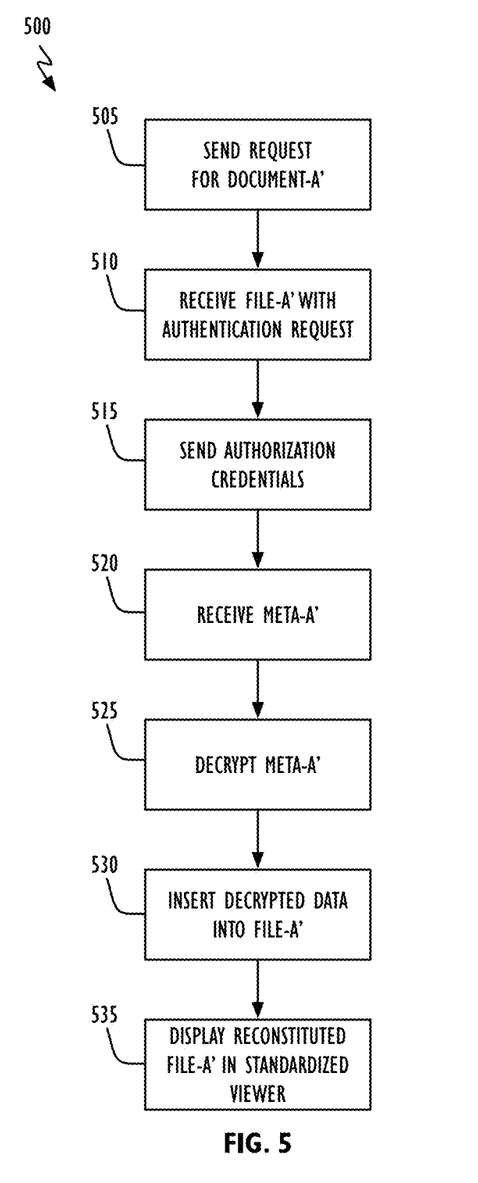
FIG. 5 shows, in flowchart form, an end-user device operation in accordance with one or more embodiments.

Consider now the situation in which an end-used wants to review and/or edit a document file created in accordance with this disclosure (e.g., document processing operation 100). Referring to FIG. 5, operation 500 begins when a client device sends a request to a network- or cloud-based server system for document-A' (block 505). In response, the client device may receive file-A' along with an authorization request from the server system (block 510). As discussed above, file-A' may include only structural information or a combination of structural and content information depending upon what content was originally selected for encryption. The client may then respond to the server system with its authorization credentials (block 515). After verification by the server system, the client device may receive encrypted metadata-A' information (block 520). Using encryption keys resident on the client device or input by the client device's end-user, encrypted data within metadata-A' may be decrypted (block 525), inserted into file-A' at their corresponding locations (block 530), and the reconstituted file displayed using a standardized viewer such as, for example, an HTML viewer such as a browser application (block 535). In one embodiment, because the document's structure and any data not designated as private is retained in plaintext (i.e., file-A'), it may be displayed immediately after being downloaded. In another embodiment, if a user has access to first content but not second content (see discussion above regarding FIG. 3), the second content may be displayed in any number of ways. For example, the second content's cyphertext may be displayed. Alternatively, standard symbol(s) or text may be displayed for each encrypted data element (e.g., a black rectangle or filler text such as "Lorem ipsum"). In yet another embodiment, one or more randomly generated text strings may be displayed.

Figure 6:
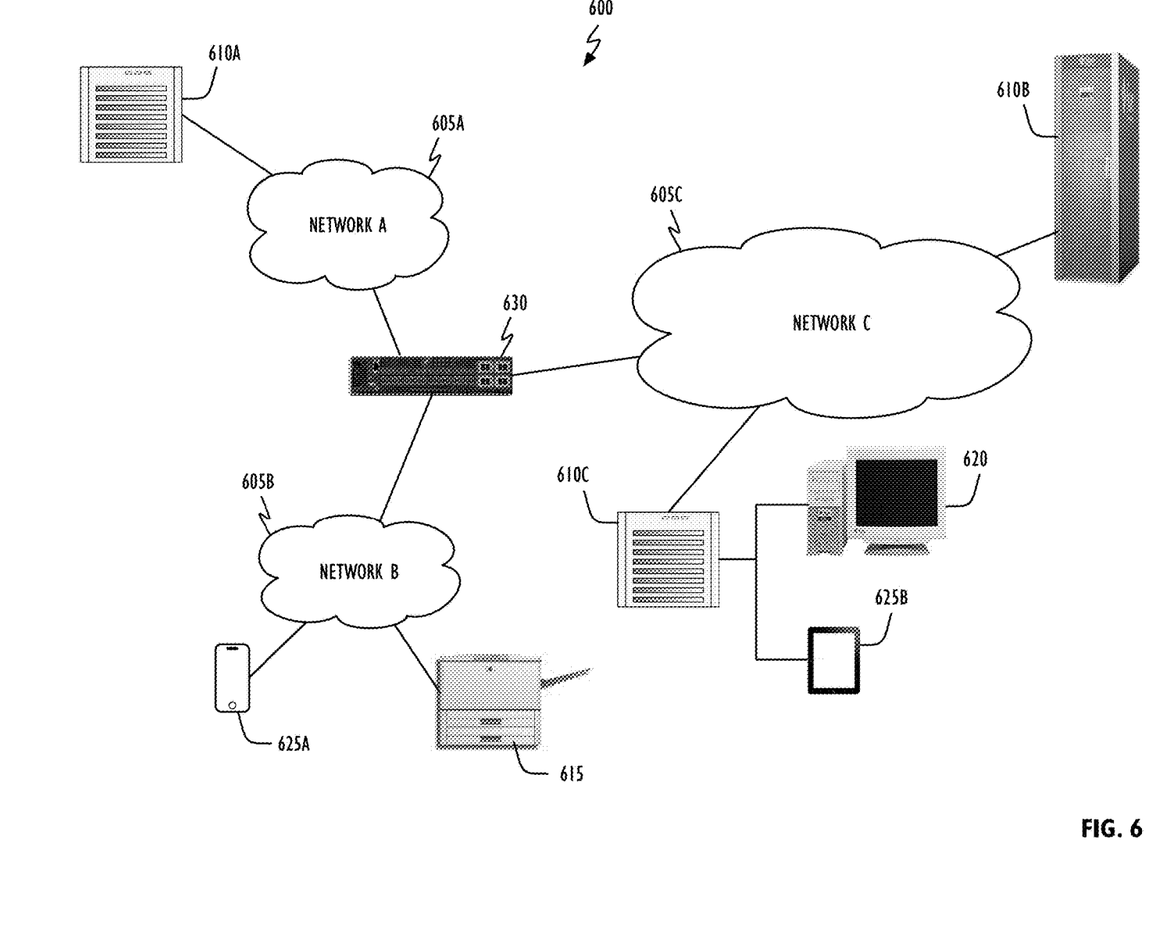
FIG. 6 shows, in block diagram form, a network architecture in accordance with one or more embodiments.

Referring now to FIG. 6, illustrative network architecture 600 within which document processing operations in accordance with this disclosure may be implemented can include a plurality of networks 605 (i.e., 605A, 605B and 605C), each of which may take any form including, but not limited to, a local area network (LAN) or a wide area network (WAN) such as the Internet. Further, networks 605 may use any desired technology (wired, wireless or a combination thereof) and communication protocol (e.g., TCP or transmission control protocol, FTP or file transfer protocol, or fibre channel protocols). Any variety of devices may be coupled to networks 605. For example, server computer systems 610 (i.e., 610A, 610B and 610C), printer 615, computer system 620 and client or end-user devices 625 (e.g., mobile telephone 625A and tablet computer system 630B). To facilitate communication between different network devices (e.g., client or end-user devices 625 and cloud-based server computer systems 610), a gateway or router 630 may be optionally coupled there between.

Figure 7:
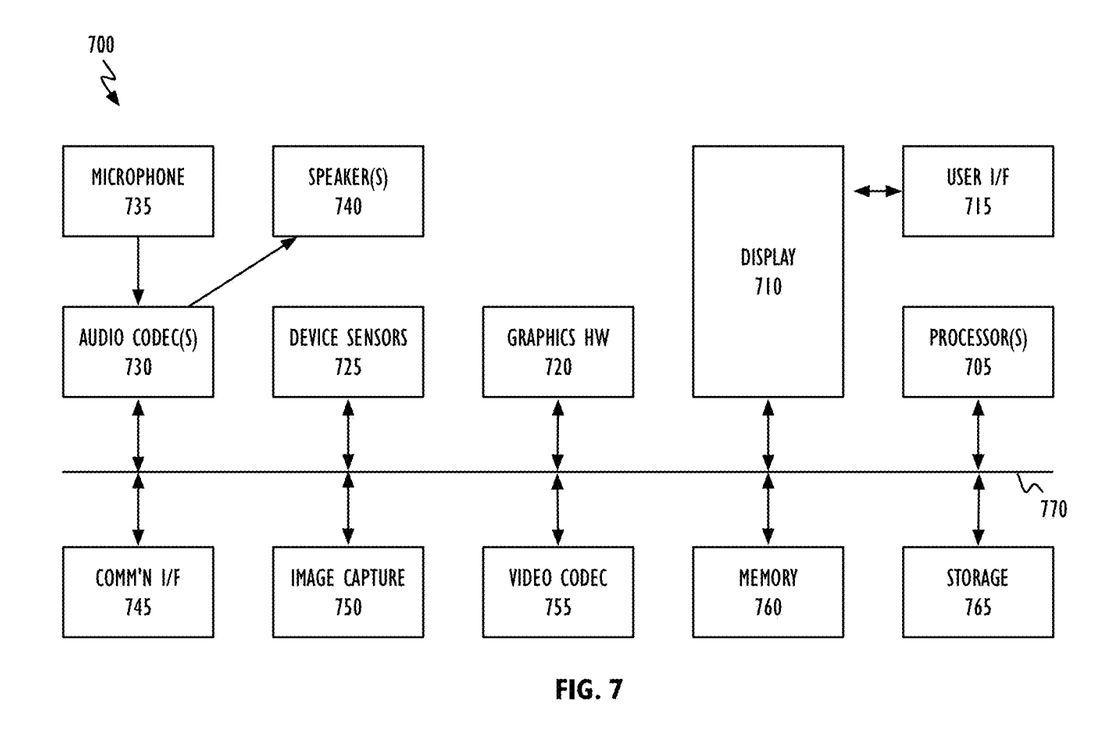
FIG. 7 shows, in block diagram form, a multi-function end-user device in accordance with one or more embodiments.

Referring to FIG. 7, a simplified functional block diagram of illustrative client or end-user device 700 is shown according to one embodiment. Client device 700 could be, for example, a mobile telephone, personal media device, portable camera, or a tablet or notebook computer system. As shown, client device 700 may include processor module 705, display element 710, user interface module or circuit 715, graphics hardware module or circuit 720, device sensors 725, audio codec(s) 730, microphone 735, speaker(s) 740, communications interface module or circuit 745, image capture module or circuit 750, video codec(s) 755, memory 760, storage 765, and communications network 770.

Processor module or circuit 705 may include one or more processing units each of which may include at least one central processing unit (CPU) and/or at least one graphics processing unit (GPU); each of which in turn may include one or more processing cores. Each processing unit may be based on reduced instruction-set computer (RISC) or complex instruction-set computer (CISC) architectures or any other suitable architecture. Processor module 705 may be a system-on-chip, an encapsulated collection of integrated circuits (ICs), or a collection of ICs affixed to one or more substrates. Processor module 705 may execute instructions necessary to carry out or control the operation of many functions performed by device 700 (e.g., document processing operations in accordance with this disclosure). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which an end-user may indicate that one or more data elements within a document are to be treated as "private" in accordance with this disclosure. User interface 715 may also be the means by which an end-user supplies encryption keys and/or authorization credentials. Graphics hardware module or circuit 720 may be special purpose computational hardware for processing graphics and/or assisting processor 705 perform computational tasks. In one embodiment, graphics hardware 720 may include one or more GPUs, and/or one or more programmable GPUs and each such unit may include one or more processing cores. Device sensors 725 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Audio codec(s) 730 may take input from microphone(s) 735 (or processor module 705, communication interface 745, memory 760 or storage 765) and generate output to one or more speakers 740. Communication interface 745 may be used to connect device 700 to one or more networks (e.g., networks 605). Illustrative networks include, but are not limited to, a local network such as a Universal Serial Bus (USB) network, an organization's local area network, and a wide area network such as the Internet. Communication interface 745 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Image capture module or circuit 750 may include one or more image sensors, one or more lens assemblies, and any other known imaging component that enables image capture operations (still or video). In one embodiment, the one or more image sensors may include a charge-coupled device (CCD) or complementary metal oxide semiconductor (CMOS) sensor. Output from image capture circuitry 750 may be processed, at least in part, by video codec(s) 755 and/or processor 705 and/or graphics hardware 720, and/or a dedicated ISP incorporated within circuitry 750. Images so captured may be stored in memory 760 and/or storage 765. Memory 760 may include one or more different types of media (typically solid-state, but not necessarily so) used by processor module 705, graphics hardware 720, device sensors 725, communication interface 745, and image capture module 750. For example, memory 760 may include memory cache, read-only memory (ROM), and/or random access memory (RAM). Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain media (e.g., document and video files), preference information, device profile information, computer program instructions or code organized into one or more modules and written in any desired computer programming languages, and any other suitable data. When executed by processor module 705 and/or graphics hardware 720 such computer program code may implement one or more of the methods described herein. Storage 765 may also be used to retain cryptographic keys/credentials and other user- or device-specific authorization information. This type of information may also be retained in special-purpose cryptographic hardware within device 700 (not shown). System bus or backplane 770 may be comprised of one or more continuous (as shown) or discontinuous communication links and be formed as a bus network, a communication network, or a fabric comprised of one or more switching devices. System bus or backplane 770 may be, at least partially, embodied in a network router or hub, a wireless access point (AP) or repeater, a set-top box, or a combination thereof.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other as well as with additional readily-understood elements common in the industry). By way of example, a client device could retain a copy of an original document (e.g., document-A), a copy of a document's structural information (e.g., file-A'), a copy of a document's encrypted data (e.g., metadata-A'), or a copy of a fully converted document (as received from a network- or cloud-based server system). In addition, a client device could request a network or cloud-based server system re-convert a file (i.e., back into a format associated with a full-featured documents processing application) after updating/editing the file. In addition, FIGS. 1-5 show flowcharts illustrating various aspects of the disclosed embodiments. In one or more embodiments, one or more of the disclosed steps may be omitted, repeated, and/or performed in a different order than that described herein. Accordingly, the specific arrangement of steps or actions shown in these figures should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network-based document processing method, comprising:
    requesting, from a network-based server system, a converted document at a digital end-user device, wherein the converted document includes a plaintext portion and a cyphertext portion, the plaintext portion comprising a plaintext structural element, the plaintext structural element having a token, the cyphertext portion comprising the token and a corresponding cyphertext;
    receiving, at the digital end-user device, the plaintext portion and an authorization request from the network-based server system in response to the requesting;
    sending authorization credentials from the digital end-user device to the network-based server system in response to the authorization request;
    receiving, at the digital end-user device, the cyphertext portion from the network-based server system in response to the authorization credentials;
    decrypting, by the digital end-user device, the cyphertext to generate content;
    identifying, by the digital end-user device, a location in the plaintext portion based on the cyphertext's corresponding token;
    replacing, by the digital end-user device, the token in the plaintext portion with the content; and
    displaying, at the digital end-user device, the converted document based on the plaintext structural element and the content.

2. The method of claim 1, wherein the plaintext structural element comprises a markup structural element.

3. The method of claim 1, wherein sending authorization credentials comprises sending a username.

4. The method of claim 1, wherein decrypting comprises:
    generating a prompt;
    receiving an input in response to the prompt;
    obtaining a decryption key based on the input; and
    decrypting the cyphertext based on the decryption key to generate the content.

5. The method of claim 4, wherein obtaining a decryption key comprises using the input as the decryption key.

6. The method of claim 1, wherein decrypting comprises:
    obtaining a decryption key; and
    decrypting the cyphertext based on the decryption key to generate the content.

7. The method of claim 1, wherein displaying comprises displaying the converted document in a browser application.

8. A digital end-user device, comprising:
    a network interface;
    a user interface;
    a display element;
    memory operatively coupled to the network interface, the user interface and the display element; and
    one or more processors operatively coupled to the network interface, the user interface, the display element and the memory, the one or more processors configured to execute instructions stored in the memory to cause the digital end-user device to:
        request, from a network-based server system and through the network interface, a converted document, wherein the converted document includes a plaintext portion and a cyphertext portion, the plaintext portion comprising a plaintext structural element, the plaintext structural element having a token, the cyphertext portion comprising the token and a corresponding cyphertext;
        receive, through the network interface, the plaintext portion and an authorization request from the network-based server system in response to the request;
        send, through the network interface, authorization credentials to the network-based server system in response to the authorization request;
        receive, through the network interface, the cyphertext portion from the network-based server system in response to the authorization credentials;
        decrypt the cyphertext to generate content;
        identify a location in the plaintext portion based on the cyphertext's corresponding token;
        replace the token in the plaintext portion with the content; and
        display the converted document based on the plaintext structural element and the content.

9. The digital end-user device of claim 8, wherein the plaintext structural element comprises a markup structural element.

10. The digital end-user device of claim 8, wherein the instructions to cause the one or more processors to send authorization credentials comprise instructions to cause the one or more processors to send a username.

11. The digital end-user device of claim 8, wherein the instructions to cause the one or more processors to decrypt comprise instructions to cause the one or more processors to:
    generate a prompt on the display element;
    receive an input in response to the prompt;
    obtain a decryption key based on the input; and
    decrypt the cyphertext based on the decryption key to generate the content.

12. The digital end-user device of claim 11, wherein the instructions to cause the one or more processors to obtain a decryption key comprise instructions to cause the one or more processors to use the input as the decryption key.

13. The digital end-user device of claim 8, wherein the instructions to cause the one or more processors to display comprise instructions to cause the one or more processors to display, on the display element, the converted document in a browser application.

14. A non-transitory computer readable medium comprising computer executable instructions stored thereon to cause one or more processors to execute instructions to:
    request, from a network-based server system and through a network interface, a converted document, wherein the converted document includes a plaintext portion and a cyphertext portion, the plaintext portion comprising a plaintext structural element, the plaintext structural element having a token, the cyphertext portion comprising the token and a corresponding cyphertext;

receive, through the network interface, the plaintext portion and an authorization request from a network-based server system in response to the request;

send, through the network interface, authorization credentials to the network-based server system in response to the authorization request;

receive, through the network interface, the cyphertext portion from the network-based server system in response to the authorization credentials;

decrypt the cyphertext to generate content;

identify a location in the plaintext portion based on the cyphertext's corresponding token;

replace the token in the plaintext portion with the content; and display the converted document based on the plaintext structural element and the content.

15. The non-transitory computer readable medium of claim 14, wherein the plaintext structural element comprises a markup structural element.

16. The non-transitory computer readable medium of claim 14, wherein the instructions to cause the one or more processors to send authorization credentials comprise instructions to cause the one or more processors to send a username.

17. The non-transitory computer readable medium of claim 14, wherein the instructions to cause the one or more processors to decrypt comprise instructions to cause the one or more processors to:

generate a prompt on a display element;

receive an input in response to the prompt;

obtain a decryption key based on the input; and decrypt the cyphertext based on the decryption key to generate the content.

18. The non-transitory computer readable medium of claim 17, wherein the instructions to cause the one or more processors to obtain a decryption key comprise instructions to cause the one or more processors to use the input as the decryption key.

19. The non-transitory computer readable medium of claim 14, wherein the instructions to cause the one or more processors to decrypt the cyphertext to generate content further comprise instructions to cause the one or more processors to:

obtain a decryption key; and decrypt the cyphertext based on the decryption key to generate the content.

20. The non-transitory computer readable medium of claim 14, wherein the instructions to cause the one or more processors to display comprise instructions to cause the one or more processors to display, on a display element, the converted document in a browser application.

* * * * *